United States Patent [19]
Fozzard

[11] 3,819,493

[45] June 25, 1974

[54] PROCESS FOR SEPARATING HALOGENATED HYDROCARBONS BY EXTRACTIVE DISTILLATION

[75] Inventor: George B. Fozzard, Bartlesville, Okla.

[73] Assignee: Phillips Petroleum Company, Bartlesville, Okla.

[22] Filed: Apr. 26, 1973

[21] Appl. No.: 354,549

[52] U.S. Cl. ............... 203/70, 204/59 R, 260/653 R
[51] Int. Cl. ......................... B01d 3/40, C07c 17/38
[58] Field of Search ............... 260/653 R; 204/59 R; 203/68–70, 55, 84

[56] References Cited
UNITED STATES PATENTS

| | | | |
|---|---|---|---|
| 3,004,075 | 10/1961 | Marcali | 260/653 R |
| 3,101,304 | 8/1963 | Wiist | 260/653 R |
| 3,689,373 | 9/1972 | Hutchinson | 260/653 R |
| 3,689,374 | 9/1972 | Hanson | 260/653 R |
| 3,692,635 | 9/1972 | Fozzard | 260/653 R |

*Primary Examiner*—Wilbur L. Bascomb, Jr.

[57] ABSTRACT

A process for separating 1,1,1,2-tetrafluoroethane from a first mixture of 1,1,1,2-tetrafluoroethane and 1,1-difluoroethane by adding a saturated hydrocarbon having in the range of 4–10 carbon atoms per molecule to the first mixture and extractively distilling the second mixture.

5 Claims, No Drawings

PROCESS FOR SEPARATING HALOGENATED HYDROCARBONS BY EXTRACTIVE DISTILLATION

This invention resides in the separation of halogenated hydrocarbons from a first mixture and, more particularly, to a process for separating 1,1,1,2-tetrafluoroethane from a mixture of 1,1,1,2-tetrafluoroethane and 1,1-difluoroethane.

In order to simplify the description of this process, 1,1,1,2-tetrafluoroethane is hereafter referred to as 134a and 1,1-difluoroethane is hereafter referred to as 152a.

In various hydrocarbon processes known in the art, mixtures of 134a and 152a are formed. It sometimes then becomes advantageous to separate the halogenated hydrocarbons of the mixture for recovering the valuable constituents or for further processing. An example source of the 134a-152a first mixture is formed as a product of electrochemical fluorination of ethane. The process of electrochemical fluorination of ethane is known in the art and is not a part of this application, and it should be understood that the halogenated hydrocarbon separation process of this invention can be utilized without regard to the process by which the halogenated hydrocarbons were admixed to form the first mixture.

Another example source of the 134a-152a first mixture is formed in the electrochemical fluorination of 152a. The electrochemical fluorination of 152a using a porous anode yields all fluoroethanes except monofluoroethane and 1,2-difluoroethane. All of the products can be easily purified except 134a, which cannot be separated by ordinary distillation from the feedstock component 152a.

In their separate and pure state, the constituents of the first mixture have boiling points and a relative volatility at atmospheric pressure as follows:

| Constituent | Boiling Point, °C. | Relative Volatility, 134a/152a |
|---|---|---|
| 134a | −26.5 | 1.06 |
| 152a | −24.7 | — |

The above tabulation indicates that it is next to impossible to separate 134a and 152a by ordinary distillation because of the close boiling points and attendant low value of relative volatility. Value of the relative volatility must generally be 1.1 or higher before separation by ordinary distillation is economical in a commercial operation. When the relative volatility drops much below 1.1, industry generally resorts to extractive or azeotropic distillation by which means extraneous agents are added to the system to be separated to effect an increase in the relative volatility.

To illustrate that n-butane is an effective agent for increasing the volatility of 134a relative to 152a by an extractive distillation process, mixtures of 134a and 152a containing various amounts of n-butane were equilibrated, the resulting liquid and vapor phases samples and analyzed, and a relative volatility of 1.6 calculated by standard procedures was obtained. This demonstrated that n-butane is a very desirable selective solvent for use in separation of 134a and 152a by extractive distillation.

EXAMPLE

The vapor-liquid equilibrium cell consisted of a three-neck, pear-shaped flask of 50 ml. capacity fitted with an immersion heater, septum for sampling liquid with a syringe, a septum for vapor samples and a jacketed cold finger condenser. The flask was immersed in a dry ice-trichloromonofluoromethane (F-11) bath in a dewar container at a temperature slightly below the boiling point of 134a (−26.5° C.)/152a (−24.7° C.) mixture. This mixture and n-butane were charged as vapor to the apparatus. After about 30 minute reflux, samples were taken by syringe from the liquid and from the vapor over the liquid. These samples were analyzed with an Aerograph 1520 gas chromatograph using a 20ft. × 1/4 in. Porapak Q column held at 175° C. and a thermal conductivity (hot wire) detector. Table I gives analysis of liquid and vapor phases after equilibrium. Three different mixtures of 134a and 152a were used with various amounts of n-butane. The analysis of the vapor and liquid phases are obtained from the chromatograms as area percent and compare the ratio of 134a to 152a and the ratio of n-butane to combined 134a + 152a. The factor K is defined as:

$K =$ area percent 134a in vapor/area percent 134a in liquid × area percent 152a in liquid/area percent 152a in vapor The $K$ defined here is similar to $\alpha$ (relative volatility) which is used for binary systems (A + B) and is defined as:

$\alpha =$ conc. A in vapor/conc. A in liquid × conc. B in liquid/conc. B in vapor The analyses as reported in "area" percents are approximately equivalent to mol percents and could be converted to mol percents. However, as used in calculating K factors, it is immaterial whether the concentrations are expressed in mol, weight, volume, or area units as the units cancel out. Therefore, "area" percents are used as obtained from the chromatograms.

Both K and $\alpha$ are measures of degree of separation to be expected from each theoretical tray in a fractionation. The relative volatility (K) for the 134a/152a mixture alone of 1.06 is too low for practical separation by ordinary distillation.

The relative volatility (K) of 1.6 obtained for the mixture 134a/152a with n-butane demonstrates that n-butane is a very desirable solvent for use in separation of 134a and 152a by extractive distillation.

While n-butane is the preferred solvent, other saturated hydrocarbons having in the range of 4–10 carbon atoms per molecule can be used. Open chain or branched chain saturated hydrocarbons or mixtures may also be used. Examples of saturated hydrocarbons are: isobutane, pentanes, hexanes, and decanes. Branched chain saturated hydrocarbons are neopentane, isopentane, neohexane, 3-ethyl-2-methylpentane, etc.

Table I

Vapor-Liquid Equilibria for the 134a/152a/n-butane System
Concentration by GLC Analysis
Peak Area Percent
n-butane free basis

| Phase | n-butane | Fluorocarbons on 134a | 152a | K |
|---|---|---|---|---|
| L | 63 | 29 | 71 | 1.6 |
| V | 31 | 39 | 61 | |
| L | 80 | 27 | 73 | 1.5 |
| V | 34 | 35 | 65 | |
| L | 90 | 25 | 75 | 1.7 |
| V | 31 | 36 | 64 | |
| L | 60 | 74 | 26 | 1.6 |
| V | 33 | 82 | 18 | |
| L | 63 | 72 | 28 | 1.7 |
| V | 46 | 82 | 18 | |
| L | 50 | 74 | 26 | 1.6 |
| V | 29 | 82 | 18 | |
| L | 80 | 92 | 8 | 1.7 |
| V | 31 | 95 | 5 | |
| L | 82 | 93 | 7 | 1.5 |
| V | 33 | 95 | 5 | |
| L | 81 | 96 | 4 | 1.6 |
| V | 31 | 97 | 3 | |
| L | 83 | 96 | 4 | 1.6 |
| V | 28 | 97 | 3 | |
| L | 0 | 32 | 68 | 1.06 |
| V | 0 | 33.2 | 66.8 | |
| L | 0 | 31 | 69 | 1.06 |
| V | 0 | 32.3 | 67.7 | |

It was also demonstrated that 152a is easily separated from solvent X (the kettle product) by ordinary distillation. This permits recycle of the solvent X to the top of the column.

The commercial extractive distillation column is operated according to conventional procedures, i.e., the 134a–152a mixture is fed to the center of a bubble tray-equipped fractionator containing approximately 50 trays. Solvent X is fed to the top of the fractionator and passes downwardly as a liquid through the trays to the bottom. The 134a being more volatile than 152a in the presence of the solvent passes in the relatively pure state from the top of the fractionator where it is condensed, part returned as a reflux, and the remainder taken as high purity 134a product. The bottoms stream from the fractionator consists of a mixture of solvent X and 152a. This mixture is passed to a second fractionator or stripper for separation of 152a and solvent X, an easy separation because of the wide separation in boiling points. The recovered solvent X is recycled to the top of the extractive distillation column. The 152a is recovered as high purity product. The extractive distillation column operates at about 25 psia pressure and at a temperature of between about 100° and about 200° F. The stripper operates at about 50 psia with a bottoms product temperature of about 400° F.

Other modifications and alterations of this invention will become apparent to those skilled in the art from the foregoing discussion and examples and it should be understood that this invention is not to be unduly limited thereto.

What is claimed is:

1. A process for separating 1,1,1,2-tetrafluoroethane from a first mixture of 1,1,1,2-tetrafluoroethane and 1,1-difluoroethane, comprising:
   adding a saturated hydrocarbon having in the range of 4–10 carbon atoms per molecule to the first mixture for forming a resultant second mixture;
   extractively distilling the second mixture in an extractive distillation zone; and
   recovering 1,1,1,2-tetrafluoroethane from the extractive distillation zone.

2. A process, as set forth in claim 1, wherein the saturated hydrocarbon is n-butane.

3. A process, as set forth in claim 1, including removing a second mixture of 1,1-difluoroethane and the added saturated hydrocarbon from the extractive distillation zone.

4. A process, as set forth in claim 3, including separating 1,1-difluoroethane from the added saturated hydrocarbon by distilling the second mixture.

5. A process, as set forth in claim 4, including recycling the separated saturated hydrocarbon for mixing with other first mixtures.

* * * * *